United States Patent
Pehlke

(10) Patent No.: US 9,768,941 B2
(45) Date of Patent: Sep. 19, 2017

(54) DUPLEXER ARCHITECTURES AND METHODS FOR ENABLING ADDITIONAL SIGNAL PATH

(71) Applicant: SKYWORKS SOLUTIONS, INC., Woburn, MA (US)

(72) Inventor: David Richard Pehlke, Westlake Village, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 375 days.

(21) Appl. No.: 14/263,852

(22) Filed: Apr. 28, 2014

(65) Prior Publication Data

US 2014/0321339 A1   Oct. 30, 2014

Related U.S. Application Data

(60) Provisional application No. 61/817,288, filed on Apr. 29, 2013.

(51) Int. Cl.
| | |
|---|---|
| *H04L 5/14* | (2006.01) |
| *H04B 1/00* | (2006.01) |
| *H04B 1/525* | (2015.01) |

(52) U.S. Cl.
CPC ............... *H04L 5/14* (2013.01); *H04B 1/006* (2013.01); *H04B 1/525* (2013.01)

(58) Field of Classification Search
CPC ......... H04L 5/14; H04B 1/005; H04B 1/0053; H04B 1/0057; H04B 1/006; H04B 1/0067
See application file for complete search history.

(56) References Cited

U.S. PATENT DOCUMENTS

| | | | |
|---|---|---|---|
| 5,815,048 A | 9/1998 | Ala-Kojola et al. | |
| 6,249,687 B1 | 6/2001 | Thomsen et al. | |
| 8,036,148 B2 * | 10/2011 | Fukamachi | H04B 1/0057 370/282 |
| 2002/0090974 A1 * | 7/2002 | Hagn | H04B 1/005 455/552.1 |

(Continued)

OTHER PUBLICATIONS

International Search Report and Written Opinion issued on Sep. 26, 2014 in connection with corresponding PCT Application No. PCT/US2014/035750.

(Continued)

*Primary Examiner* — Ricky Ngo
*Assistant Examiner* — Stephen Steiner
(74) *Attorney, Agent, or Firm* — Chang & Hale LLP

(57) ABSTRACT

Disclosed are architectures and methods for enabling additional signal path. In some embodiments, a frequency division duplexing (FDD) system can include a transmit (Tx) path configured for passage of a Tx signal in a first frequency band during operation in a first mode; a receive (Rx) path configured for passage of an Rx signal in a second frequency band during operation in a second mode, with the second mode being different than the first mode, and the second frequency band having at least some overlap with the first frequency band; and a bandpass filter disposed along the Tx path and along the Rx path, with the bandpass filter being configured to filter the Tx signal when in the first mode and to filter the Rx signal when in the second mode. Such a system can be advantageous in wireless devices capable of operating in different geographic locations.

13 Claims, 7 Drawing Sheets

(56) References Cited

U.S. PATENT DOCUMENTS

| | | | |
|---|---|---|---|
| 2007/0082646 A1* | 4/2007 | Behzad | H04B 1/005 |
| | | | 455/339 |
| 2008/0080453 A1 | 4/2008 | Rofougaran | |
| 2009/0058556 A1 | 3/2009 | Niiranen et al. | |
| 2011/0249599 A1* | 10/2011 | Kaluzni | H04B 1/0057 |
| | | | 370/281 |
| 2011/0249603 A1* | 10/2011 | Rick | H04B 1/006 |
| | | | 370/311 |
| 2014/0307836 A1* | 10/2014 | Khlat | H04L 5/1461 |
| | | | 375/343 |

OTHER PUBLICATIONS

Evolved Universal Terrestrial Radio Access (E-UTRA), User Equipment (UE) radio transmission and reception, 3GPP TS 36.101, v11.4.0, Mar. 2013.
PCT/US2014,035750, Duplexer Architectures and Methods for Enabling Additional Signal Path.

* cited by examiner

DUPLEXER ARCHITECTURES AND METHODS FOR ENABLING ADDITIONAL SIGNAL PATH

CROSS-REFERENCE TO RELATED APPLICATIONS

This application claims priority to U.S. Provisional Application No. 61/817,288 filed Apr. 29, 2013, entitled CIRCUITS AND METHODS RELATED TO DUPLEXER ARCHITECTURE FOR ENABLING ADDITIONAL SIGNAL PATH, the disclosure of which is hereby expressly incorporated by reference herein in its entirety.

BACKGROUND

Field

The present disclosure generally relates to duplexer architectures in wireless applications.

Description of the Related Art

Wireless communication systems such as cellular systems, operating frequencies are typically assigned to different bands. A given wireless network can utilize a number of such frequency bands to facilitate transmission (TX) and/or receive (RX) operations.

Many wireless devices are configured to provide duplex capability to allow TX and RX operations to be performed generally concurrently. In time-division duplexing (TDD) systems, duplexing can be achieved by use of synchronized sequence of TX and RX operations in a given frequency. In frequency-division duplexing (FDD) systems, duplexing can be achieved by use of different frequencies for the TX and RX operations.

SUMMARY

In some implementations, the present disclosure relates to a frequency division duplexing (FDD) system that includes a transmit (Tx) path configured for passage of a Tx signal in a first frequency band during operation in a first mode. The FDD system further includes a receive (Rx) path configured for passage of an Rx signal in a second frequency band during operation in a second mode. The second mode is different than the first mode, and the second frequency band has at least some overlap with the first frequency band. The FDD system further includes a bandpass filter implemented along the Tx path and along the Rx path. The bandpass filter is configured to filter the Tx signal when in the first mode and to filter the Rx signal when in the second mode.

In some embodiments, the first band can include at least a portion of a B28 Tx band. The first band can be a B28A Tx band having a frequency range of 703 MHz to 733 MHz. The second band can be a B29 Rx band having a frequency range of 716 MHz to 728 MHz.

In some embodiments, the bandpass filter can be a part of a duplexer configured for duplex operation in the first mode. In some embodiments, the second mode can be an Rx-only mode.

In some embodiments, the FDD system can further include a post-power amplifier (post-PA) switch configured to receive and route the Tx signal from a PA to the bandpass filter. The post-PA switch can be further configured to receive and route the Rx signal from the bandpass filter to a receiver. The post-PA switch can include a double-pole-2-throw (DP2T) switch functionality to facilitate operation in the first mode, the second mode, and a third mode. The first mode can include a B28A duplex mode, the second mode can include a B29 Rx-only mode, and the third mode can include a B28B duplex mode.

In some embodiments, the FDD system can further include an antenna switch configured to receive and route the Tx signal from the bandpass filter to an antenna. The antenna switch can be further configured to receive and route the Rx signal from the antenna to the bandpass filter. The antenna switch can be configured to include a single-pole-M-throw (SPMT) functionality, with the quantity M being an integer greater than 1. The single pole can be in communication with the antenna, and one of the M throws can be in communication with the bandpass filter. The sharing of the bandpass filter between the Tx path and the Rx path can result in the quantity M being less than N by at least 1, with the quantity N being integer greater than M and representative of a number of throws in a configuration where the Tx path and the Rx path do not share a bandpass filter.

In some embodiments, the sharing of the bandpass filter between the Tx path and the Rx path can result in a number of filters associated with the first frequency band and the second frequency band being reduced by at least one.

In some embodiments, the FDD system can be configured to operate in only one of the first and second modes at any given time. In some embodiments, the first mode can be configured for operation in a first geographic region and the second mode can be configured for operation in a second geographic region. The first and second geographic regions can be sufficiently separated to inhibit operation in one mode in a non-corresponding geographic region.

In accordance with a number of implementations, the present disclosure relates to a method for operating a wireless device having a frequency division duplexing (FDD) system. The method includes detecting a wireless network. The method further includes determining whether a network change is desired. The method further includes performing a switching operation, if the network change is desired, to change between a transmit (Tx) signal path of one network and a receive (Rx) signal path of another network, where both of the Tx signal path and the Rx signal path share a common filter.

According to some implementations, the present disclosure relates to a radio-frequency (RF) module that includes a packaging substrate configured to receive a plurality of components. The RF module further includes a frequency division duplexing (FDD) system implemented on the packaging substrate. The FDD system includes a transmit (Tx) path configured for passage of a Tx signal in a first frequency band during operation in a first mode. The FDD system further includes a receive (Rx) path configured for passage of an Rx signal in a second frequency band during operation in a second mode. The second mode is different than the first mode, and the second frequency band has at least some overlap with the first frequency band. The FDD system further includes a bandpass filter implemented along the Tx path and along the Rx path. The bandpass filter is configured to filter the Tx signal when in the first mode and to filter the Rx signal when in the second mode. In some embodiments, the RF module can be a front-end module (FEM).

In a number of teachings, the present disclosure relates to a wireless device that includes a transceiver configured to process radio-frequency (RF) signals. The wireless device further includes a frequency division duplexing (FDD) system in communication with the transceiver. The FDD system is configured to facilitate routing of the RF signals. The FDD system includes a transmit (Tx) path configured for passage of a Tx signal in a first frequency band during operation in a first mode. The FDD system further includes a receive (Rx) path configured for passage of an Rx signal in a second frequency band during operation in a second mode. The second mode is different than the first mode, and the second frequency band has at least some overlap with the first frequency band. The FDD system further includes a bandpass filter implemented along the Tx path and along the Rx path. The bandpass filter is configured to filter the Tx signal when in the first mode and to filter the Rx signal when in the second mode. The wireless device further includes an antenna in communication with the FDD system. The antenna is configured to transmit the Tx signal and receive the Rx signal.

In some embodiments, the wireless device can be configured to be capable of operating in the first mode at a first geographic location and in the second mode at a second geographic location. The first and second geographic locations can be sufficiently separated to inhibit operation in one mode in a non-corresponding geographic region.

In some implementations, the present disclosure relates to a duplexing architecture having a bandpass filter implemented for operation in a B28A Tx band and a B29 Rx band. The present disclosure also relates to a front-end module having a signal routing circuit that includes a bandpass filter implemented for operation in a B28A Tx band and a B29 Rx band. The present disclosure also relates to a wireless device having a duplexing architecture that includes a bandpass filter implemented for operation in a B28A Tx band and a B29 Rx band. One or more features of the present disclosure can also be implemented in other combinations of cellular frequency bands.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION OF SOME EMBODIMENTS

The headings provided herein, if any, are for convenience only and do not necessarily affect the scope or meaning of the claimed invention.

Figure 1A:
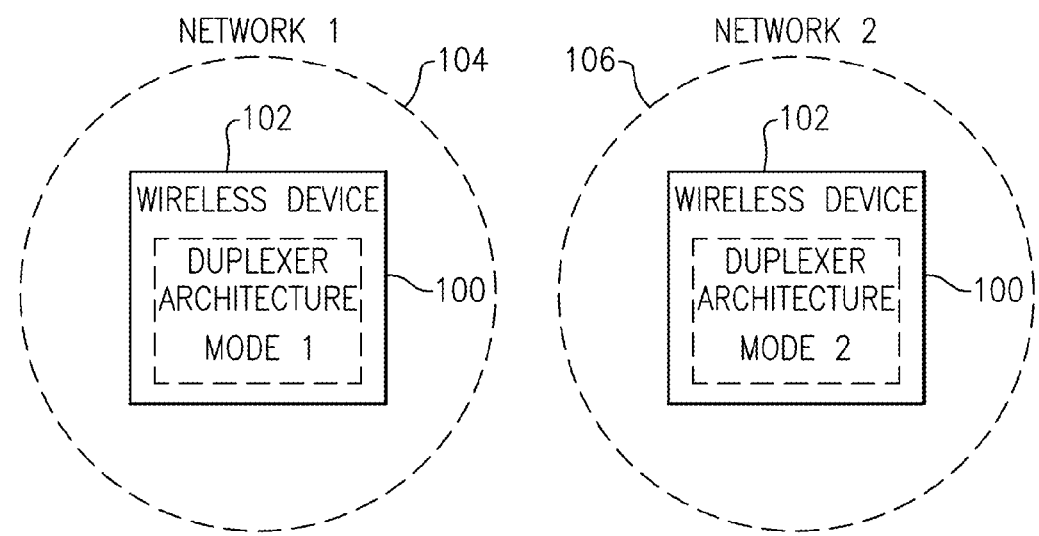
FIG. 1A depicts a wireless device having a duplexer architecture capable of operating in a first mode when in a first wireless network, and operating in a second mode when in a second wireless network.

Disclosed herein are circuits and methods related to duplex architectures for enabling one or more additional radio-frequency (RF) signal paths utilizing one or more existing components. In some embodiments, such a feature can be implemented in wireless devices that are configured to operate in different networks. By way of an example, FIG. 1A depicts a wireless device 102 having a duplexer architecture 100 operating in a first mode in a first wireless network 104. In a second wireless network 106, the duplexer architecture 100 of the same wireless device 102 can be configured to operate in a second mode.

In the example of FIG. 1A, the first and second networks 104, 106 can be separated geographically with sufficient distance so that the wireless device 102 can only operate in one of the two example modes at any given time. For example, there are operating cellular frequency bands that can overlap, but are assigned for usage in separated locations such as North America and Asia.

Figure 1B:
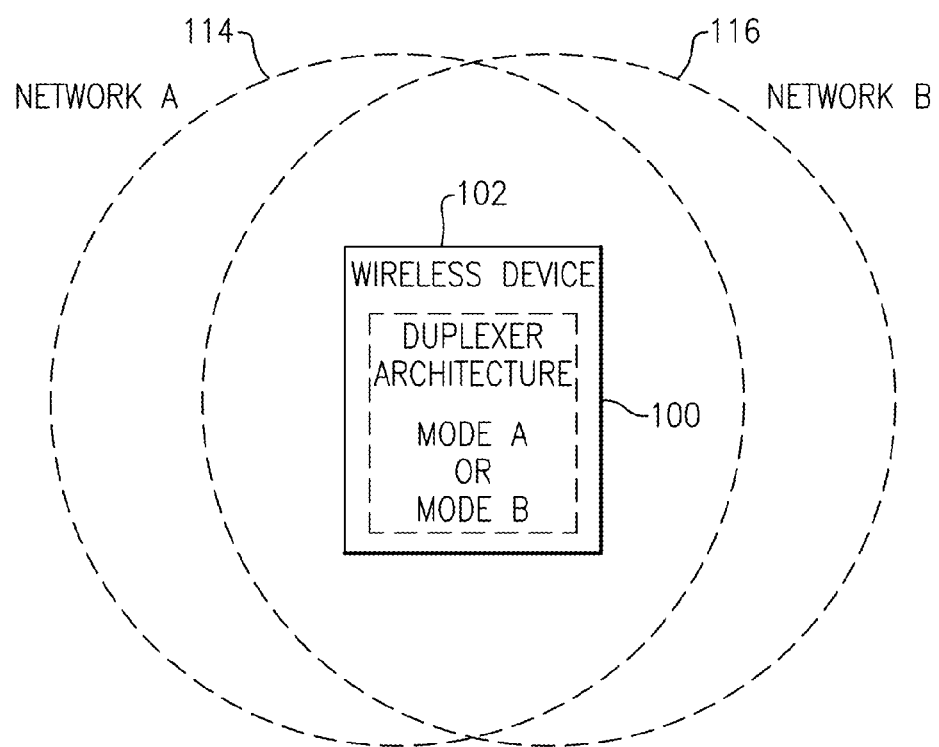
FIG. 1B shows an example where a first network and a second network can both be accessible by a wireless device at a given location.

Various examples are described herein in the foregoing context of two geographically-separated wireless networks. However, it will be understood that one or more features of the present disclosure can also be implemented in a situation where two networks are not necessarily separated geographically as in the example of FIG. 1A. FIG. 1B shows an example where a first network (114, Network A) and a second network (116, Network B) can both be accessible by a wireless device 102 at a given location. A duplexer architecture 100 can be configured so that the wireless device 102 can operate in either network (Mode A or Mode B) by performing an appropriate mode-switching operation.

Figure 2:
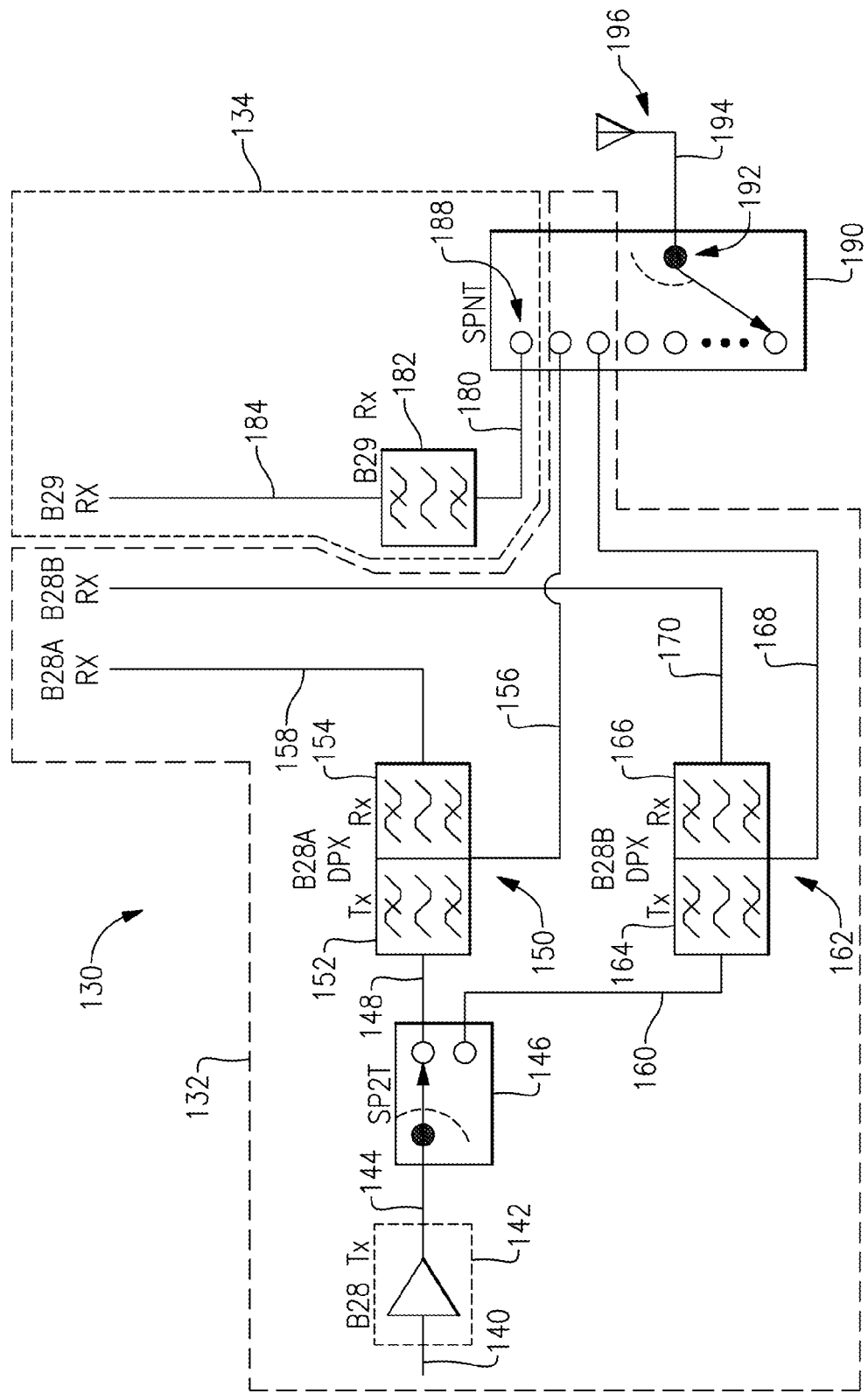
FIG. 2 shows an example architecture configured to allow a wireless device to operate in example bands B28 and B29 that are typically implemented in geographically separated regions.

FIG. 2 shows an example architecture 130 configured to allow a wireless device to operate in example bands B28 and B29 that are typically implemented in geographically separated regions. In FIG. 2, a portion of the architecture 130 corresponding to the B28 band is generally depicted as 132, and a portion of the architecture 130 corresponding to the B29 band is generally depicted as 134.

B28 band is a long term evolution (LTE) frequency division duplexing (FDD) band (Tx=703-748 MHz, Rx=758-803 MHz) which is typically used in Asia. In some applications, the B28 band is implemented as B28A (Tx=703-733 MHz, Rx=758-788 MHz) and B28B (Tx=718-748 MHz, Rx=773-803 MHz). Each of the B28A and B28B bands is typically provided with its own duplexer, due to, for example, challenges associated with bandwidth and duplex gap. Further, in some regions such as Japan, there can be an issue associated with coexistence with digital TV.

Band 29 is an LTE band recently defined and released by the 3rd Generation Partnership Project (3GPP) organization, for use in the United States for an Rx-only band (716-728 MHz). Such a band can be carrier aggregated with high bands where both Tx and Rx active FDD link can then add this B29 Rx-only band for an increase in downlink data rate.

In the example architecture 130 of FIG. 2, the B28 band can be configured as follows. For transmission, an RF signal can be provided (through path 140) to a power amplifier (PA) 142. Such a PA can be a band-specific PA, or a PA capable of amplifying RF signals in the B28 band. For the purpose of description, the PA 142 can also be referred to as a B28 Tx PA.

An output of the B28 Tx PA 142 can be provided to a post-PA switch 146 through path 144. The post-PA switch 146 can be, for example, a single-pole-two-throw (SP2T) switch configured to receive the amplified Tx signal and route it to either a B28A duplexer 150 (also referred to as B28A DPX) through path 148, or a B28B duplexer 162 (also referred to as B28B DPX) through path 160.

When operating in the B28A mode, the amplified Tx signal can be filtered by a Tx filter 152 (e.g., a bandpass filter) of the B28A duplexer 150, and the filtered output can be routed to an antenna switch 190 (e.g., an antenna switch module (ASM)) through path 156. In such an operating mode, a pole 192 of the antenna switch 190 can be connected to the throw associated with the path 156 so as to route the amplified and filtered Tx signal to an antenna 196 through path 194.

In duplex operation, a signal can be received through the antenna 196 and be routed to an Rx filter 154 (e.g., a bandpass filter) of the B28 A duplexer 150 through the path 194, the switch 190, and the path 156. A filtered output of the Rx filter 154 can be processed as an Rx signal through path 158.

Similarly, when operating in the B28B mode, the amplified Tx signal can be filtered by a Tx filter 164 (e.g., a bandpass filter) of the B28B duplexer 162, and the filtered output can be routed to the antenna switch 190 through path 168. In such an operating mode, the pole 192 of the antenna switch 190 can be connected to the throw associated with the path 168 so as to route the amplified and filtered Tx signal to the antenna 196 through path 194.

In duplex operation, a signal can be received through the antenna 196 and be routed to an Rx filter 166 (e.g., a bandpass filter) of the B28B duplexer 162 through the path 194, the switch 190, and the path 168. A filtered output of the Rx filter 166 can be processed as an Rx signal through path 170.

When operating in the B29 (Rx) mode, a signal can be received through the antenna 196 and be routed to the antenna switch 190. The pole 192 of the switch 190 can be connected to the throw 188 so as to route the received signal to an Rx filter 182 (also referred to as B29 Rx) through path 180. A filtered output of the Rx filter 182 can be processed as an Rx signal through path 184.

In the example architecture 130 of FIG. 2, the antenna switch 190 can be a single-pole-N-throw (SPNT), with the pole 192 in communication with the antenna 196, and one of the throws (e.g., throw 188) being dedicated to the B29 Rx filter 182. It is noted that the channel associated with the throw 188 and/or the B29 Rx filter 182 can increase the cost and size requirement in the architecture 130.

As described herein, the example bands B28 and B29 are typically implemented in geographically separated regions. Accordingly, a given wireless device will likely not be subjected to these two bands at the same time.

It is noted that the B29 Rx band (716-728 MHz) overlaps with the B28A Tx band (703-733 MHz). Thus, in some implementations, the B28A Tx filter (152 in FIG. 2) can be used for a B29 Rx path. As described herein by way of an example, such a configuration can allow removal of the channel (e.g., throw 188 in FIG. 2) and the dedicated B29 Rx filter 182, thereby reducing cost and size associated with the duplexer architecture 100.

Figure 3:
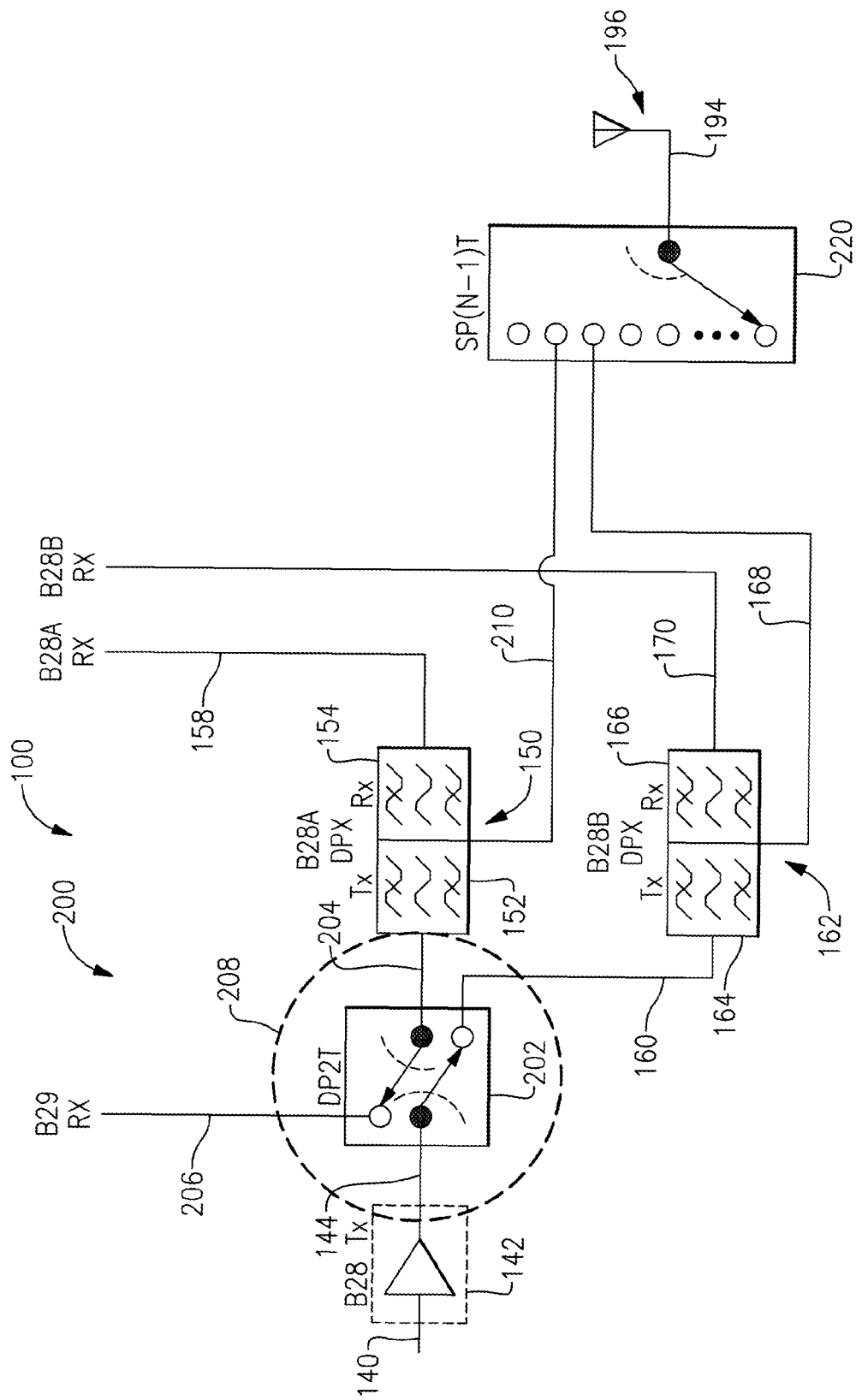
FIG. 3 shows an architecture similar to the example of FIG. 2, but with a dedicated B29 Rx filter removed to reduce cost and size associated with the architecture.

FIG. 3 shows a configuration 200 that can be an example of such a duplexer architecture 100. In the example of FIG. 3, Tx signal input 140, PA 142, and PA output 144 can be similar to those described in reference to FIG. 2. Also, duplex operations of the B28A and B28B bands can also be generally similar to those described in reference to FIG. 2.

As shown in FIG. 3, a B28A Tx filter 152 of a B28A duplexer 150 can provide dual functionality. First, the B28A Tx filter 152 can provide filtering of an amplified Tx signal from the PA 142. The amplified Tx signal from the PA 142 can be provided to the B28A Tx filter 152 through a switch 202. The filtered Tx signal can be routed to an antenna 196 through path 210, a SP(N−1)T antenna switch 220, and path 194 so as to be transmitted as a B28A Tx band signal. Second, the B28A Tx filter 152 can provide filtering of a signal received by the antenna 196 and routed in reverse through the same path (the path 194, the antenna switch 220, and the path 210) so as to yield a filtered Rx signal. The filtered Rx signal is shown to be routed through the switch 202 and path 206 for further processing as a B29 Rx band signal.

In some embodiments, the foregoing routings (the amplified Tx signal from the PA 142 to the B28A Tx filter 152, and the filtered Rx signal from the B28A Tx filter 152 to the B29 Rx path 206) as well as the routing of an amplified Tx signal from the PA 142 to the B28B Tx filter 164 can be achieved by the switch 202. An assembly 208 of the switch 202 with its input and output paths is shown in greater detail in FIG. 4.

Figure 4A:
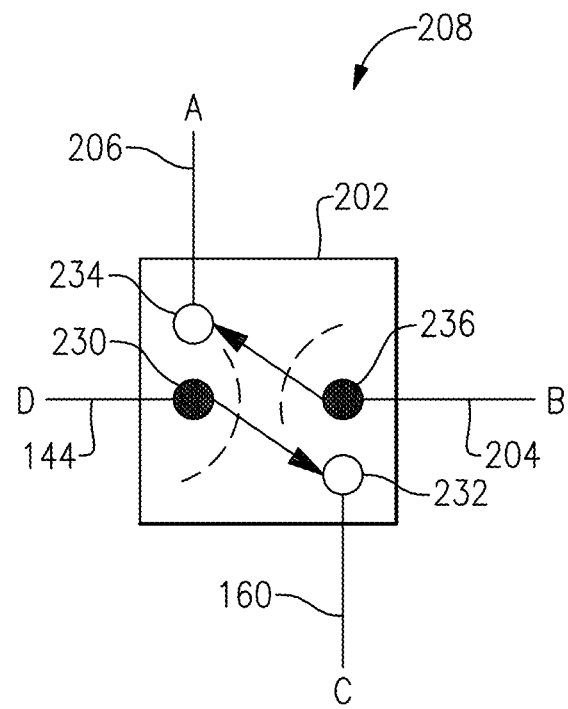
FIG. 4A shows an example switching configuration that can be utilized to facilitate the example architecture of FIG. 3.

As shown in FIGS. 3 and 4, the switch 202 can be a double-pole-2-throw (DP2T) switch. In FIG. 4A, node A corresponds to the B29 Rx path 206, node B corresponds to the path 204 into the B28A Tx filter 152, node C corresponds to the path 160 into the B28B Tx filter 164, and node D corresponds to the path 144 from the PA 142. Within the switch, the path 144 (node D) can be connected to a first pole 230, and the path 204 (node B) can be connected to a second pole 236. The path 160 (node C) can be connected to a first throw 232, and the path 206 (node A) can be connected to a second throw 234. Each of the first and second poles 230, 236 can be switched between the first and second throws 232, 234 to thereby provide the DP2T switching functionality.

Figure 4B:
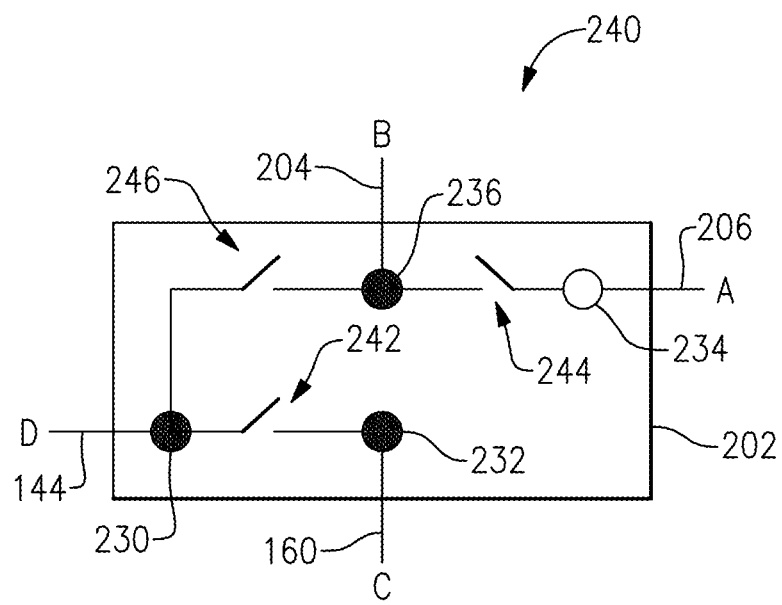
FIG. 4B shows a switching circuit that can be implemented as an example of the switching configuration of FIG. 4A.

FIG. 4B shows an example switching circuit 240 that can provide the DP2T functionality of the switching configuration 208 of FIG. 4A. In FIG. 4B, the nodes A-D and their corresponding paths (206, 204, 160, 144) and poles/throws (234, 236, 232, 230) are similar to those described in reference to FIG. 4A.

FIG. 4B further shows that the switching circuit 240 can include a first switch 246 between the first pole 230 and the second pole 236, a second switch 244 between the second pole 236 and the second throw 234, and a third switch 242 between the first pole 230 and the first throw 232. To operate in the various modes, states of the switches 246, 244, 242 can be selected as listed in Table 1. For the purpose of description, "ON" can refer to a switch being closed and conducting, and "OFF" can refer to a switch being open and not conducting.

TABLE 1

| Mode | First switch 246 | Second switch 244 | Third switch 242 |
|---|---|---|---|
| B28A Tx | ON | OFF | OFF |
| B28B Tx | OFF | OFF | ON |
| B29 Rx | OFF | ON | OFF |

As described herein, the post-PA switch 202 of FIGS. 3 and 4 can include one additional pole (to yield a DP2T configuration) when compared to the post-PA switch 146 (a SP2T configuration) of FIG. 2. By providing such an additional throw at an already existing post-PA switch, the foregoing dual functionality of a filter (e.g., an existing Tx filter such as a B28A Tx filter) can be facilitated. In some implementations, such an additional throw at the post-PA switch can involve a relatively small increase in cost and size. In return, significant cost and/or size benefits can be realized by removing a filter (e.g., an Rx filter such as a B29 Rx filter) and its corresponding throw in an antenna switch.

Figure 5:
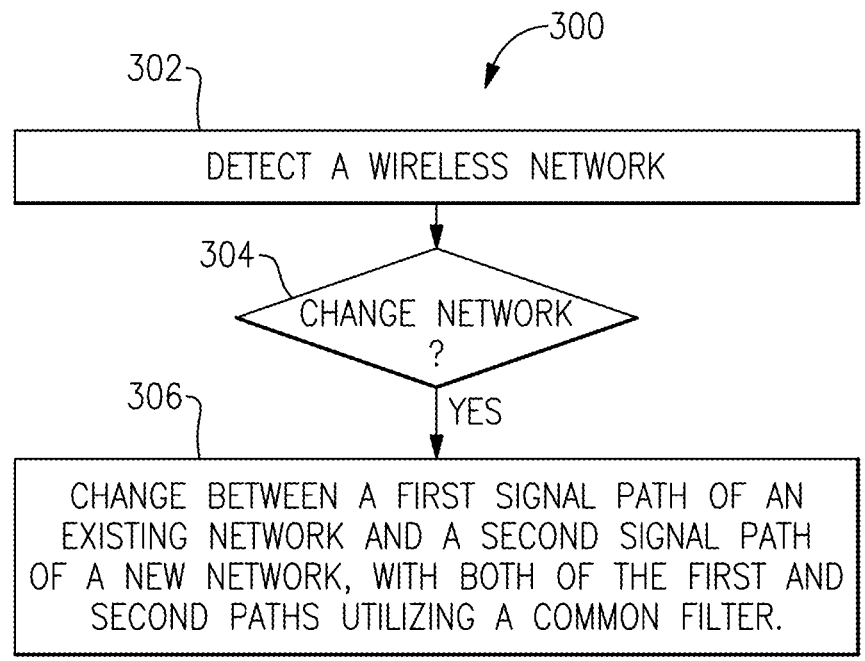
FIG. 5 shows a process that can be implemented to achieve one or more features as described herein.

FIG. 5 shows a process 300 that can be implemented to achieve one or more features as described herein. In block 302, a wireless network can be detected. In a decision block 304, the process 300 can determine whether a change in network is needed based on the detected network. If the answer is Yes, the process 300 in block 306 can induce a change between a first signal routing configuration associated with an existing network and a second signal routing configuration associated with a new network. In some embodiments, both of the first and second routing configurations can utilize a common filter.

Figure 6:
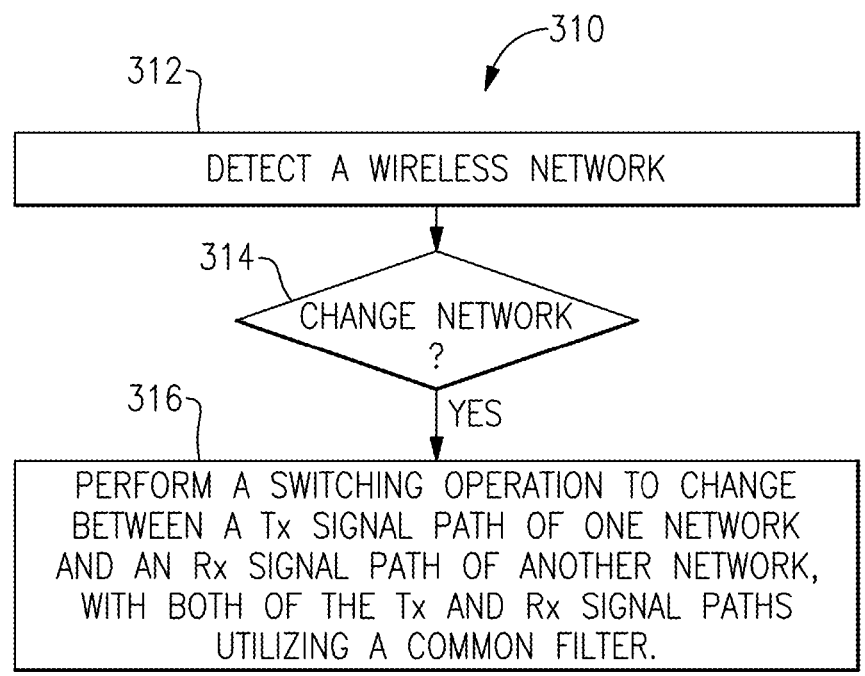
FIG. 6 shows another process that can be implemented to achieve one or more features as described herein.

FIG. 6 shows another process 310 that can be implemented to achieve one or more features as described herein. In block 312, a wireless network can be detected. In a decision block 314, the process 310 can determine whether a change in network is needed based on the detected network. If the answer is Yes, the process 310 in block 316 can induce or perform a switching operation to change between a Tx signal path associated with one network and an Rx signal path associated with another network. In some embodiments, both of the Tx and Rx signal paths can utilize a common filter.

Figure 7:
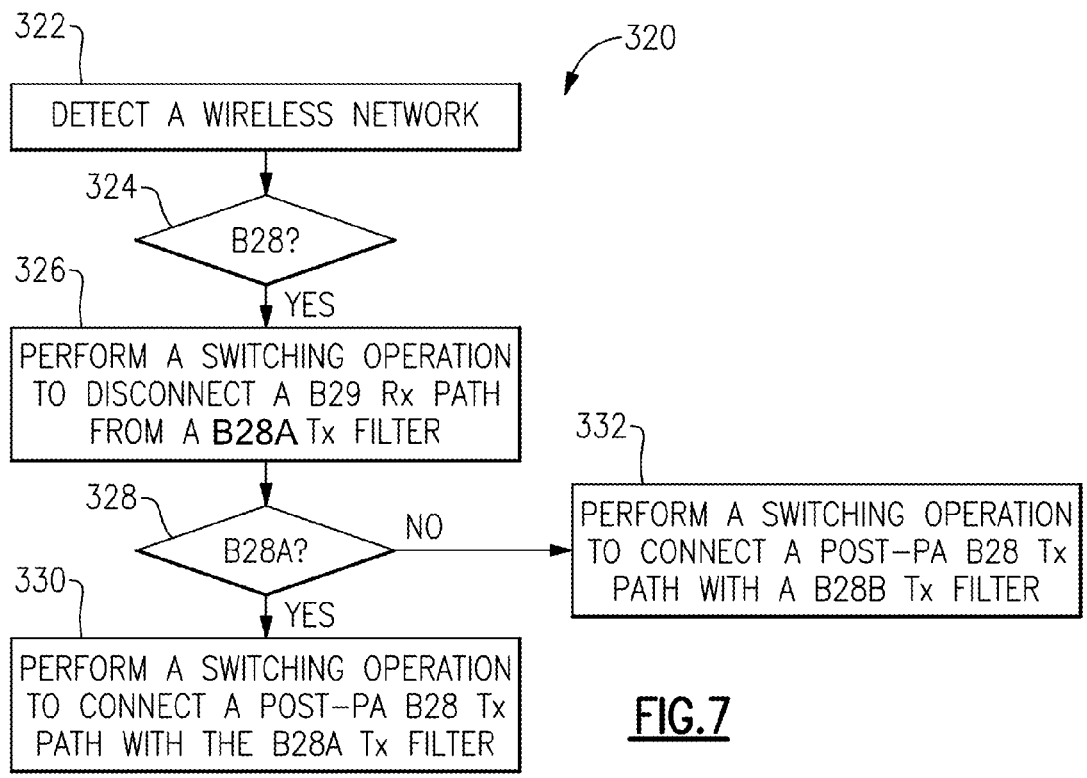
FIGS. 7 and 8 show processes that can be implemented as more specific examples of the processes of FIGS. 5 and 6.
Figure 8:
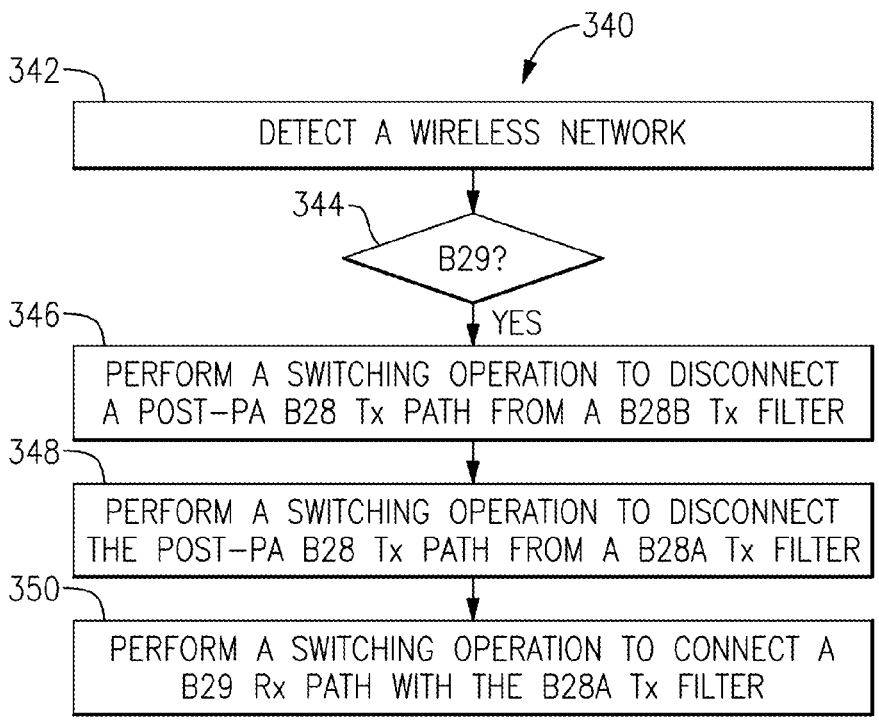

FIGS. 7 and 8 show processes 320 and 340 that can be implemented as more specific examples of the processes described in reference to FIGS. 5 and 6. In the process 320 of FIG. 7, a wireless network can be detected in block 322. In a decision block 324, the process 320 can determine whether the detected network is a B28 band. If the answer is Yes, the process 320 in block 326 can induce or perform a switching operation to disconnect a B29 Rx path from a B28 Tx filter. In a decision block 328, the process 320 can then determine whether the B28 band is a B28A band. If the answer is Yes, the process 320 in block 330 can induce or perform a switching operation to connect a post-PA B28 Tx path with the B28A Tx filter. If the answer is No, the process 320 in block 332 can induce or perform a switching operation to connect a post-PA B28 Tx path with a B28B Tx filter. In some embodiments, the foregoing switch operations can be performed in sequence determined by the decision blocks, or a set of switch status, such as the example of Table 1, can be implemented directly after the final mode is determined.

In the process 340 of FIG. 8, a wireless network can be detected in block 342. In a decision block 344, the process 340 can determine whether the detected network is a B29 band. If the answer is Yes, the process 340 in block 346 can induce or perform a switching operation to disconnect a post-PA B28 Tx path from a B28B Tx filter. In block 348, the process 340 can induce or perform a switching operation to disconnect the post-PA B28 Tx path from a B28A Tx filter. In block 350, the process 340 can induce or perform a switching operation to connect a B29 Rx path with the B28A Tx filter. In some embodiments, such switch operations associated with blocks 346, 348, 350 can be performed simultaneously, in sequence, or any combination thereof. In some embodiments, a set of switch status, such as the example of Table 1, can be implemented directly to effectuate the B29 Rx mode.

In some implementations, an architecture, a device and/or a circuit having one or more features described herein can be included in an RF device such as a wireless device. Such an architecture, a device and/or a circuit can be implemented directly in the wireless device, in one or more modular forms, or in some combination thereof. In some embodiments, such a wireless device can include, for example, a cellular phone, a smart-phone, a hand-held wireless device with or without phone functionality, a wireless tablet, a wireless router, a wireless access point, a wireless base station, etc.

Figure 9:
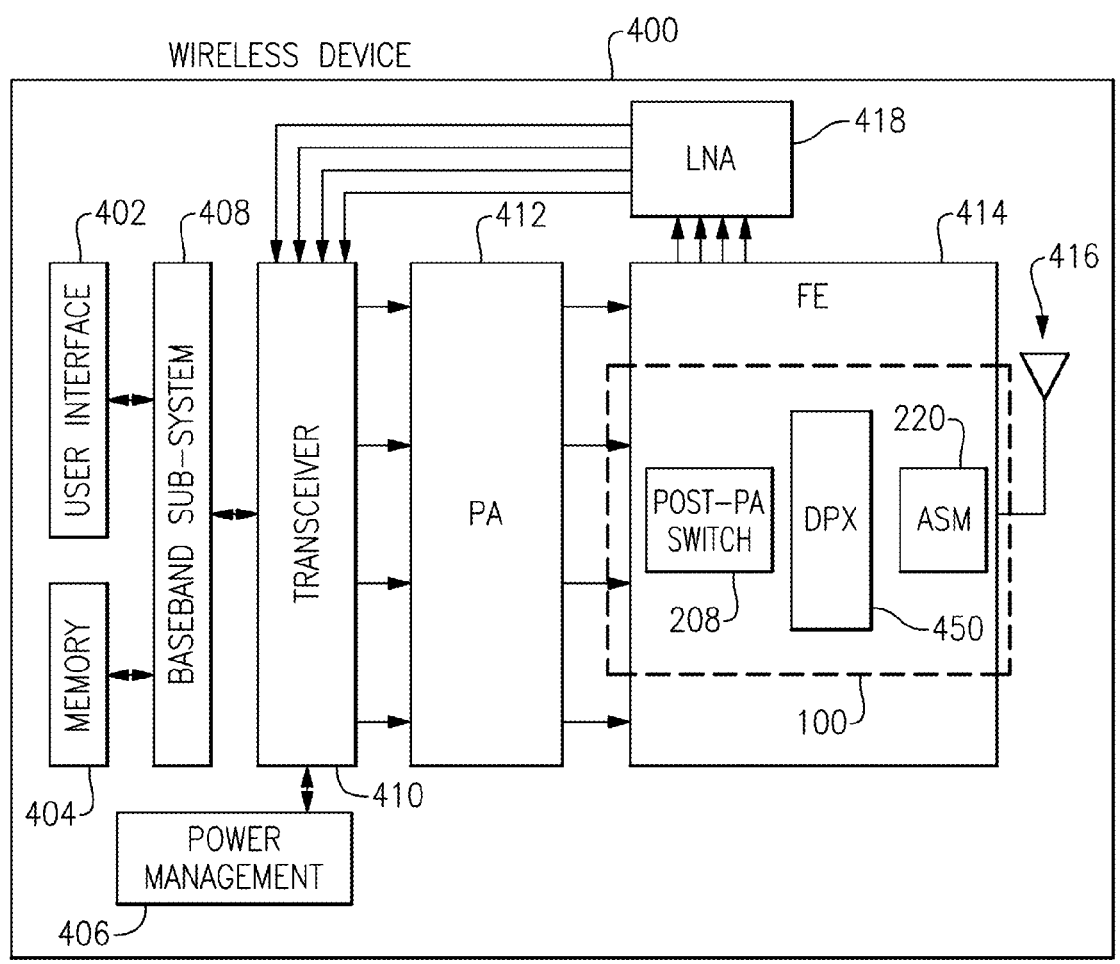
FIG. 9 depicts a wireless device having one or more advantageous features described herein.

FIG. 9 schematically depicts an example wireless device 400 having one or more advantageous features described herein. In some embodiments, such advantageous features can be implemented in a duplexer architecture 100 as described herein. At least some portion of such a duplexer architecture can be implemented in a front-end (FE) module 414. Accordingly, the FE module 414 can include a post-PA switch 208, a duplexer (DPX) assembly 450, and an antenna switch module (ASM) 220, with each component having one or more features described herein. The FE module 414 can include a packaging substrate such as a laminate substrate configured to receive a plurality of components. Such components can include some or all of the foregoing post-PA switch 208, duplexer assembly 450, and ASM 220.

PAs in a PA module 412 can receive their respective RF signals from a transceiver 410 that can be configured and operated to generate RF signals to be amplified and transmitted, and to process received signals. The transceiver 410 is shown to interact with a baseband sub-system 408 that is configured to provide conversion between data and/or voice signals suitable for a user and RF signals suitable for the transceiver 410. The transceiver 410 is also shown to be connected to a power management component 406 that is configured to manage power for the operation of the wireless device 400. Such power management can also control operations of the baseband sub-system 408 and other components of the wireless device 400.

The baseband sub-system 408 is shown to be connected to a user interface 402 to facilitate various input and output of voice and/or data provided to and received from the user. The baseband sub-system 408 can also be connected to a memory 404 that is configured to store data and/or instructions to facilitate the operation of the wireless device, and/or to provide storage of information for the user.

In the example wireless device 400, outputs of the PAs of the PA module 412 are shown to be provided to the FE module 414. Functionalities such as band-selection can be implemented in the FE module 414. In FIG. 9, received signals are shown to be routed from the FE module 414 to one or more low-noise amplifiers (LNAs) 418. Amplified signals from the LNAs 418 are shown to be routed to the transceiver 410.

Although various examples are described herein in the context of B28 Tx and B29 Rx bands, it will be understood that one or more features of the present disclosure can be implemented with other cellular frequency bands, including those among the bands listed in Table 2. It will also be understood that one or more features of the present disclosure can be implemented with frequency ranges that do not have designations such as the examples of Table 2.

TABLE 2

| Band | Mode | Tx Frequency Range (MHz) | Rx Frequency Range (MHz) |
|---|---|---|---|
| B1 | FDD | 1,920-1,980 | 2,110-2,170 |
| B2 | FDD | 1,850-1,910 | 1,930-1,990 |
| B3 | FDD | 1,710-1,785 | 1,805-1,880 |
| B4 | FDD | 1,710-1,755 | 2,110-2,155 |
| B5 | FDD | 824-849 | 869-894 |
| B6 | FDD | 830-840 | 875-885 |
| B7 | FDD | 2,500-2,570 | 2,620-2,690 |
| B8 | FDD | 880-915 | 925-960 |
| B9 | FDD | 1,749.9-1,784.9 | 1,844.9-1,879.9 |
| B10 | FDD | 1,710-1,770 | 2,110-2,170 |
| B11 | FDD | 1,427.9-1,447.9 | 1,475.9-1,495.9 |
| B12 | FDD | 699-716 | 729-746 |
| B13 | FDD | 777-787 | 746-756 |
| B14 | FDD | 788-798 | 758-768 |
| B15 | FDD | 1,900-1,920 | 2,600-2,620 |
| B16 | FDD | 2,010-2,025 | 2,585-2,600 |
| B17 | FDD | 704-716 | 734-746 |
| B18 | FDD | 815-830 | 860-875 |
| B19 | FDD | 830-845 | 875-890 |
| B20 | FDD | 832-862 | 791-821 |
| B21 | FDD | 1,447.9-1,462.9 | 1,495.9-1,510.9 |
| B22 | FDD | 3,410-3,490 | 3,510-3,590 |
| B23 | FDD | 2,000-2,020 | 2,180-2,200 |
| B24 | FDD | 1,626.5-1,660.5 | 1,525-1,559 |
| B25 | FDD | 1,850-1,915 | 1,930-1,995 |
| B26 | FDD | 814-849 | 859-894 |
| B27 | FDD | 807-824 | 852-869 |
| B28 | FDD | 703-748 | 758-803 |
| B29 | FDD | N/A | 716-728 |
| B30 | FDD | 2,305-2,315 | 2,350-2,360 |
| B31 | FDD | 452.5-457.5 | 462.5-467.5 |
| B33 | TDD | 1,900-1,920 | 1,900-1,920 |
| B34 | TDD | 2,010-2,025 | 2,010-2,025 |
| B35 | TDD | 1,850-1,910 | 1,850-1,910 |
| B36 | TDD | 1,930-1,990 | 1,930-1,990 |
| B37 | TDD | 1,910-1,930 | 1,910-1,930 |
| B38 | TDD | 2,570-2,620 | 2,570-2,620 |
| B39 | TDD | 1,880-1,920 | 1,880-1,920 |
| B40 | TDD | 2,300-2,400 | 2,300-2,400 |
| B41 | TDD | 2,496-2,690 | 2,496-2,690 |
| B42 | TDD | 3,400-3,600 | 3,400-3,600 |
| B43 | TDD | 3,600-3,800 | 3,600-3,800 |
| B44 | TDD | 703-803 | 703-803 |

Although various examples are described herein in the context of combining functionalities of a Tx path and an Rx path, it will be understood that one or more features of the present disclosure can also be implemented in other combinations. For example, such combinations can include a first Tx path and a second Tx path, as well as a first Rx path and a second Rx path. Further, although various examples are described herein in the context of combining functionalities of two paths, it will be understood that one or more features of the present disclosure can also be implemented in applications involving more than two paths.

The present disclosure describes various features, no single one of which is solely responsible for the benefits described herein. It will be understood that various features described herein may be combined, modified, or omitted, as would be apparent to one of ordinary skill. Other combinations and sub-combinations than those specifically described herein will be apparent to one of ordinary skill, and are intended to form a part of this disclosure. Various methods are described herein in connection with various flowchart steps and/or phases. It will be understood that in many cases, certain steps and/or phases may be combined together such that multiple steps and/or phases shown in the flowcharts can be performed as a single step and/or phase. Also, certain steps and/or phases can be broken into additional sub-components to be performed separately. In some instances, the order of the steps and/or phases can be rearranged and certain steps and/or phases may be omitted entirely. Also, the methods described herein are to be understood to be open-ended, such that additional steps and/or phases to those shown and described herein can also be performed.

Some aspects of the systems and methods described herein can advantageously be implemented using, for example, computer software, hardware, firmware, or any combination of computer software, hardware, and firmware. Computer software can comprise computer executable code stored in a computer readable medium (e.g., non-transitory computer readable medium) that, when executed, performs the functions described herein. In some embodiments, computer-executable code is executed by one or more general purpose computer processors. A skilled artisan will appreciate, in light of this disclosure, that any feature or function that can be implemented using software to be executed on a general purpose computer can also be implemented using a different combination of hardware, software, or firmware. For example, such a module can be implemented completely in hardware using a combination of integrated circuits. Alternatively or additionally, such a feature or function can be implemented completely or partially using specialized computers designed to perform the particular functions described herein rather than by general purpose computers.

Multiple distributed computing devices can be substituted for any one computing device described herein. In such distributed embodiments, the functions of the one computing device are distributed (e.g., over a network) such that some functions are performed on each of the distributed computing devices.

Some embodiments may be described with reference to equations, algorithms, and/or flowchart illustrations. These methods may be implemented using computer program instructions executable on one or more computers. These methods may also be implemented as computer program products either separately, or as a component of an apparatus or system. In this regard, each equation, algorithm, block, or step of a flowchart, and combinations thereof, may be implemented by hardware, firmware, and/or software including one or more computer program instructions embodied in computer-readable program code logic. As will be appreciated, any such computer program instructions may be loaded onto one or more computers, including without limitation a general purpose computer or special purpose computer, or other programmable processing apparatus to produce a machine, such that the computer program instructions which execute on the computer(s) or other programmable processing device(s) implement the functions specified in the equations, algorithms, and/or flowcharts. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, computer program instructions, such as embodied in computer-readable program code logic, may also be stored in a computer readable memory (e.g., a non-transitory computer readable medium) that can direct one or more computers or other programmable processing devices to function in a particular manner, such that the instructions stored in the computer-readable memory implement the function(s) specified in the block(s) of the flowchart(s). The computer program instructions may also be loaded onto one or more computers or other programmable computing devices to cause a series of operational steps to be performed on the one or more computers or other programmable computing devices to produce a computer-implemented process such that the instructions which execute on the computer or other programmable processing apparatus provide steps for implementing the functions specified in the equation(s), algorithm(s), and/or block(s) of the flowchart(s).

Some or all of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors) that executes program instructions or modules stored in a memory or other non-transitory computer-readable storage medium or device. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list. The word "exemplary" is used exclusively herein to mean "serving as an example, instance, or illustration." Any implementation described herein as "exemplary" is not necessarily to be construed as preferred or advantageous over other implementations.

The disclosure is not intended to be limited to the implementations shown herein. Various modifications to the implementations described in this disclosure may be readily apparent to those skilled in the art, and the generic principles defined herein may be applied to other implementations without departing from the spirit or scope of this disclosure. The teachings of the invention provided herein can be applied to other methods and systems, and are not limited to the methods and systems described above, and elements and acts of the various embodiments described above can be combined to provide further embodiments. Accordingly, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A duplexing system comprising:
   a first duplexing circuit including a first duplexer having a first transmit filter, the first duplexing circuit configured to operate in a first frequency-division duplexing mode in which a first signal from a power amplifier is filtered by the first transmit filter;
   a second duplexing circuit including a second duplexer having a second transmit filter, the second duplexing circuit configured to operate in a second frequency-division duplexing mode in which a second signal from the power amplifier is filtered by the second transmit filter;
   a receive-only path including the first transmit filter of the first duplexer such that a received signal is by the first transmit filter routed to a receive-only output when in the second frequency-division duplexing mode; and
   a switching circuit configured to facilitate the first frequency-division duplexing mode or the second frequency-division duplexing mode during which the receive-only path is enabled.

2. The duplexing system of claim 1 wherein the first frequency-division duplexing mode includes a B28A band, and the second frequency-division duplexing mode includes a B28B band.

3. The duplexing system of claim 2 wherein the B28A band includes a transmit band having a frequency range of 703 MHz to 733 MHz.

4. The duplexing system of claim 3 wherein the receive-only path is configured operate with a B29 receive band having a frequency range of 716 MHz to 728 MHz.

5. The duplexing system of claim 1 wherein the switch circuit includes a double-pole-double-throw switch functionality to facilitate the first frequency-division duplexing mode or the second frequency-division duplexing mode.

6. The duplexing system of claim 5 wherein the double-pole-double-throw switch includes a first node coupled to the power amplifier, a second node coupled to and output of the receive-only path, a third node coupled to the first transmit filter, and a fourth node coupled to the second transmit filter.

7. The duplexing system of claim 1 further comprising an antenna switch configured to route the first signal when in the first frequency-division duplexing mode or the second signal when in the second frequency-division duplexing mode.

8. The duplexing system of claim 7 wherein the antenna switch is configured to include a single-pole-multiple-throw functionality, the single pole in communication with the antenna and a throw in communication with each of the first duplexer and the second duplexer.

9. The duplexing system of claim 1 wherein the duplexing system operates in only one of the first frequency-division duplexing mode and the second frequency-division duplexing mode at any given time.

10. The duplexing system of claim 9 wherein the first frequency-division duplexing mode is configured for operation in a first geographic region and the second frequency-division duplexing mode is configured for operation in a second geographic region.

11. The duplexing system of claim 10 wherein the first and second geographic regions are sufficiently separated to inhibit operation in one mode in a non-corresponding geographic region.

12. A wireless device comprising:

a transceiver configured to process signals;

a duplexing system in communication with the transceiver, the duplexing system configured to facilitate routing of the signals, the duplexing system including a first duplexing circuit including a first duplexer having a first transmit filter, the first duplexing circuit configured to operate in a first frequency-division duplexing mode in which a first signal from a power amplifier is filtered by the first transmit filter; a second duplexing circuit including a second duplexer having a second transmit filter, the second duplexing circuit configured to operate in a second frequency-division duplexing mode in which a second signal from the power amplifier is filtered by the second transmit filter; a receive-only path including the first transmit filter of the first duplexer such that a received signal is by the first transmit filter routed to a receive-only output when in the second frequency-division duplexing mode; and a switching circuit configured to facilitate the first frequency-division duplexing mode or the second frequency-division duplexing mode during which the receive-only path is enabled; and an antenna in communication with the duplexing system, the antenna configured to transmit a signal from the duplexing system and receive a signal for the duplexing system.

13. The wireless device of claim 12 wherein the wireless device is configured to be capable of operating in the first frequency-division duplexing mode at a first geographic location and in the second frequency-division duplexing mode at a second geographic location, the first and second geographic locations sufficiently separated to inhibit operation in one mode in a non-corresponding geographic region.

* * * * *